US008878818B2

(12) United States Patent
Chang et al.

(10) Patent No.: US 8,878,818 B2
(45) Date of Patent: Nov. 4, 2014

(54) MULTI-TOUCH OPTICAL TOUCH PANEL

(75) Inventors: Yu-Jen Chang, New Taipei (TW); Wei-Yi Hsuan, Taipei (TW); Yi-Sheng Lee, Taipei Hsien (TW); Robert D. Parsons, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 13/257,802

(22) PCT Filed: Mar. 25, 2010

(86) PCT No.: PCT/EP2010/053938
§ 371 (c)(1),
(2), (4) Date: Sep. 20, 2011

(87) PCT Pub. No.: WO2010/112404

PCT Pub. Date: Jul. 10, 2010

(65) Prior Publication Data

US 2012/0007835 A1 Jan. 12, 2012

(30) Foreign Application Priority Data

Mar. 31, 2009 (TW) .............................. 98110813 A (51) Int. Cl.
*G06F 3/042* (2006.01)

(52) U.S. Cl.
CPC .... *G06F 3/0421* (2013.01); *G06F 2203/04808* (2013.01)
USPC ...................... 345/175; 178/18.03; 178/18.09; 345/173

(58) Field of Classification Search
USPC ....................... 345/173–178; 178/18.09, 18.03
See application file for complete search history.

(56) References Cited

U.S. PATENT DOCUMENTS

| 5,162,783 | A | | 11/1992 | Moreno | |
|---|---|---|---|---|---|
| 5,414,413 | A | * | 5/1995 | Tamaru et al. ................. | 345/175 |

(Continued)

FOREIGN PATENT DOCUMENTS

| CN | 101071356 A | 11/2007 |
|---|---|---|
| CN | 101110008 A | 1/2008 |

(Continued)

OTHER PUBLICATIONS

Chunjing, Zhou, et al., Publication No. CN101110008A, Publication date: Jan. 23, 2008, English abstract, 1 page.

(Continued)

*Primary Examiner* — Dmitriy Bolotin
(74) *Attorney, Agent, or Firm* — Katherine S. Brown; Jeffrey L. Streets (57) ABSTRACT

A multi-touch optical touch panel which comprises a rectangular position-detecting surface with a length L and a width W; a first set of a plurality of light-emitting element pairs configured for emitting a plurality of light beams, wherein the first set of light-emitting element pairs are arranged at various points along a first side of the position-detecting surface in a lengthwise direction; a second set of a plurality of light-emitting elements are arranged at various points along the first side at 90 degrees with reference to the first side; two reflectors arranged along two opposed sides of the rectangular position-detecting surface in the W direction; and a first set of a plurality of light-receiving element pairs configured for receiving the plurality of light beams emitted by the first set of light-emitting element pairs, wherein the first set of light-receiving element pairs are arranged at various points along a second side of the position-detecting surface opposite to the first side in a lengthwise direction; a second set of a plurality of light-receiving elements are arranged at various points along the second side at −90 degrees with reference to the second side for receiving the plurality of light beams emitted by the second set of light-emitting elements. A control circuit is configured for causing the first set of light-emitting element pairs and the second set of light-emitting elements to emit the plurality of light beams in a predetermined order to scan the position-detecting surface, and further configured for causing the first set of light-receiving element pairs and the second set of light-receiving elements to receive the plurality of light beams, thereby forming optical paths on the position-detecting surface in a grid pattern.

10 Claims, 9 Drawing Sheets

(56) References Cited

U.S. PATENT DOCUMENTS

| | | | |
|---|---|---|---|
| 6,690,363 | B2 | 2/2004 | Newton |
| 6,961,051 | B2 | 11/2005 | Weindorf et al. |
| 8,237,685 | B2 * | 8/2012 | Van De Wijdeven et al. ............... 345/175 |
| 8,339,379 | B2 * | 12/2012 | Goertz et al. ............... 345/175 |
| 8,451,235 | B2 * | 5/2013 | Xuan et al. ............... 345/173 |
| 8,471,830 | B2 * | 6/2013 | Goertz ............... 345/175 |
| 2003/0156332 | A1 | 8/2003 | Seino et al. |
| 2008/0266266 | A1 * | 10/2008 | Kent et al. ............... 345/173 |
| 2008/0304084 | A1 | 12/2008 | Kim et al. |
| 2009/0066662 | A1 | 3/2009 | Liu et al. |
| 2009/0135162 | A1 * | 5/2009 | Van De Wijdeven et al. ............... 345/175 |
| 2009/0167724 | A1 * | 7/2009 | Xuan et al. ............... 345/175 |
| 2009/0189878 | A1 * | 7/2009 | Goertz et al. ............... 345/175 |
| 2010/0123683 | A1 * | 5/2010 | Cady et al. ............... 345/175 |
| 2011/0242056 | A1 * | 10/2011 | Lee et al. ............... 345/175 |

FOREIGN PATENT DOCUMENTS

| | | |
|---|---|---|
| CN | 101110008 A | 1/2008 |
| CN | 101669088A A | 3/2010 |
| JP | 01195526 A | 8/1989 |
| JP | H04209428 A | 7/1992 |
| WO | WO2006095320 A2 | 9/2006 |
| WO | WO2008154792 A1 | 12/2008 |
| WO | WO2008154792 A2 | 12/2008 |
| WO | WO2010112404 A1 | 10/2010 |

OTHER PUBLICATIONS

PCT/EP2010/053938, "PCT International Search Report and Written Opinion", dated Aug. 6, 2010, International Business Machines Corporation, 11 pages.

Guangdong Weichuang Rixin Elec, "Infrared touch screen and its multi-point touch positioning method", CN101071356(A) English Abstract—Nov. 14, 2007, Espacenet—Bibliographic data, 1 page.

VTRON Corp et al. "Touch panel device and multi-point touch locating method", CN101110008(A) English Abstract—Jan. 23, 2008, Espacenet—Bibliographic data, 2 pages.

Tyco Electronics Corp, "A Touchscreen for Detecting Multiple Touches", Espacenet Bibliographic data: CN101669088(A), Mar. 10, 2010, 2 Pages.

PUJ70298A, Chinese Office Action Document 100101 dated Dec. 28, 2010, "201080002790.7", 6 Pages. (Chinese application related to the present U.S. Appl. No. 13/257,802).

Tamaru Eiji, "Touch Panel Device", JP01195526A, Aug. 7, 1989 English Abstract, 1 page.

Miyake Takashi, "Position Detecting Method of Optical Touch Panel", JP61213919A, Sep. 22, 1986 English Abstract, 1 page.

Saijiyou Munetoshi et al., "Touch Switch Device", JPH04209428(A), Jul. 30, 1992, Espacenet Bibliographic Data, Abstract, 2 pages.

* cited by examiner

MULTI-TOUCH OPTICAL TOUCH PANEL

BACKGROUND

1. Field of the Invention

The various embodiments described herein relate to an optical touch panel, and, more particularly, to a multi-point optical touch panel.

2. Background of the Related Art

A variety of touch panel technologies are presently in existence, including resistive technology, capacitive technology, surface acoustical wave (SAW) technology, infrared (IR) technology, etc. Comparing with other touch panel technologies, IR technology has lots of advantages, for example, better durability, reliability, sealability, and no calibration required etc.

In the case of IR touch panel technology, infrared emitter/collector pairs are used to project an invisible grid of light a small distance over the surface of the panel. When a beam is interrupted, the absence of the signal at the collector is detected and converted to touch coordinates (e.g., X/Y rectangular coordinates). Since the method of determining a touch is optical instead of electrical or mechanical, IR touch panels are not as sensitive to damage as some technologies, such as resistive and capacitive technologies.

The construction of a conventional optical touch panel is disclosed in U.S. Pat. No. 6,597,508, which is incorporated herein by reference. FIG. 1 shown in the US patent depicts the construction of a conventional optical touch panel. The optical touch panel comprises a plurality of light-emitting elements (e.g., LEDs) arranged along two adjacent sides of a rectangular position-detecting surface and a plurality of light-receiving elements (e.g., photo transistors) 130 arranged along the other two sides of the rectangular position-detecting surface such that the light-emitting elements 110 are positioned opposite to the respective light-receiving elements and the position-detecting surface is positioned between the light-emitting elements and the light-receiving elements. In the optical touch panel, however, the light-emitting elements and the light-receiving elements must be arranged along the four sides of the position-detecting surface, and hence it takes a significant amount of time to establish wire connections among the elements. Thus, the optical touch panel is complicated, its assembly difficult, and it is difficult to reduce its size.

Another construction of a conventional optical touch panel is disclosed in Taiwan Patent Application No. 96151662, which is incorporated herein by reference.

Figure 1A:
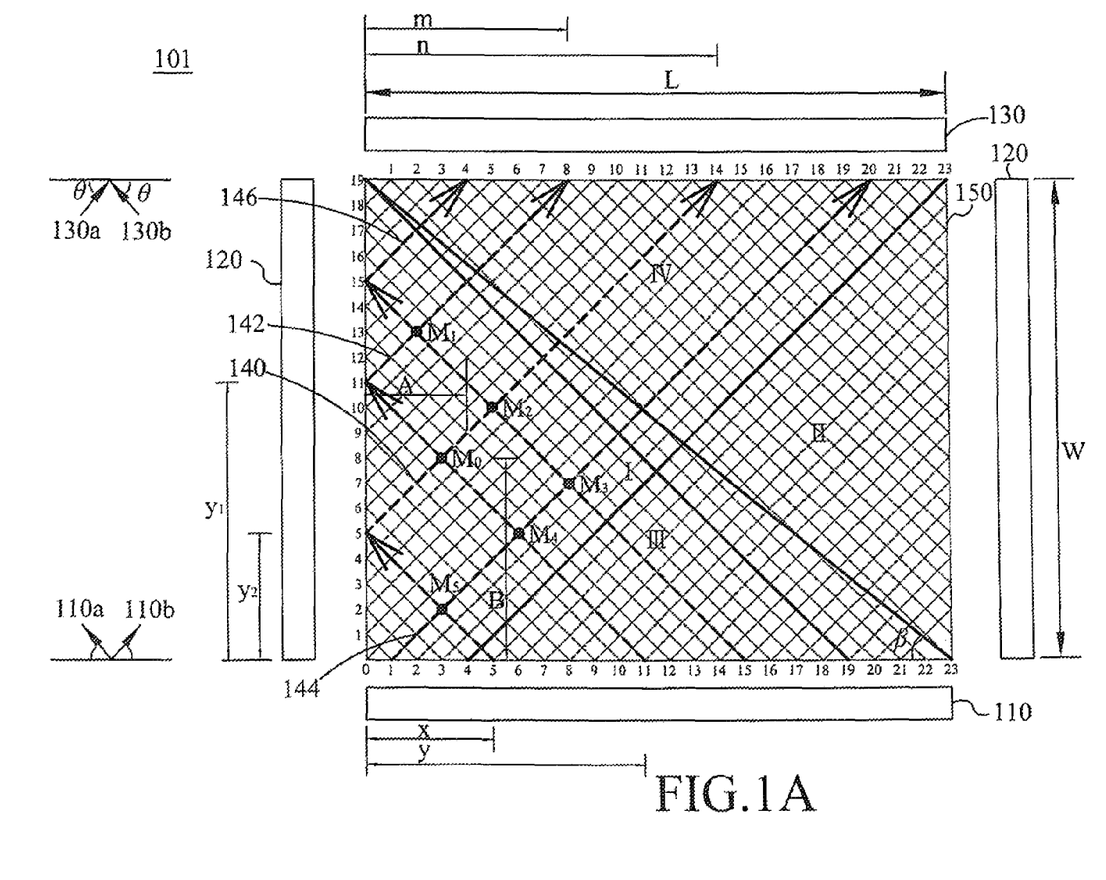
FIG. 1A is a schematic diagram of the construction of an optical touch panel 101 shown in the Taiwan patent application No. 96151662 (and counterpart US patent application US 2009/0167724.

With reference to FIG. 1A, a schematic diagram of the construction of an optical touch panel 101 shown in the Taiwan patent application No. 96151662 is provided. The optical touch panel 101 may comprise a rectangular position-detecting surface 150 with a specified length L and a specified width W (wherein L may be greater than or equal to W), a plurality of light-emitting element pairs (110*a*, 110*b*), two reflectors (e.g., mirrors) 120, and a plurality of light-receiving element pairs (130*a*, 130*b*). Each light-receiving element may be configured for receiving light beams reflected by the reflectors 120 or light beams directly emitted by the plurality of light-emitting element pairs without reflection. The plurality of light-emitting element pairs (110*a*, 110*b*) may comprise light emitting diodes (LEDs). The plurality of light-receiving element pairs (130*a*, 130*b*) may comprise photo transistors.

The plurality of light-emitting element pairs (110*a*, 110*b*) may be arranged at various points along a first side 110 of the rectangular position-detecting surface 150 in a lengthwise (L) direction. More specifically, there may be various points (e.g., point 0, point 1 . . . point L) along the first side 110 at which the plurality of light-emitting element pairs (110*a*, 110*b*) may be arranged. At each of these various points, other than the starting and the ending points (i.e., point 0 and point L, which are at the edges of the first side 110), a first light-emitting element (110*a*) and a second light-emitting element (110*b*) may be arranged in a pair [note that at the starting point (i.e., point 0), a second light-emitting element (110*b*) may be arranged, while at the ending point (i.e., point L), a first light-emitting element (110*a*) may be arranged]. The first light-emitting element (110*a*) may be arranged at the left side of each light-emitting element pair (110*a*, 110*b*) at an angle 180—θ with reference to the first side 110, and the second light-emitting element (110*b*) may be arranged at the right side of each light-emitting element pair (110*a*, 110*b*) at an angle θ with reference to the first side 110. The angle θ with reference to the first side 110 may be greater than an angle β, which may be the angle of the diagonal line of the rectangular position-detecting surface 150 with reference to the x-axis of the rectangular position-detecting surface 150. According to the exemplary embodiment of the Taiwan patent application No. 96151662, the angle θ may be 45 degrees, in which case the angle between the first light-emitting element (110*a*) and the second light-emitting element (110*b*) of each light-emitting element pair (110*a*, 110*b*) is 90 degrees.

Similarly, the plurality of light-receiving element pairs (130*a*, 130*b*) may be arranged at various points along a second side 130 opposite to the first side 110 of the rectangular position-detecting surface 150 in the lengthwise (L) direction. More specifically, there may be various points (e.g., point 0, point 1 . . . point L) along the second side 130 at which the plurality of light-receiving element pairs (130*a*, 130*b*) may be arranged. At each of these various points, other than the starting and the ending points (i.e., point 0 and point L, which are at the edges of the second side 130), a first light-receiving element (130*a*) and a second light-receiving element (130*b*) may be arranged in pair [note that at the starting point (i.e., point 0), a second light-receiving element (130*b*) may be arranged, while at the ending point (i.e., point L), a first light-receiving element (130*a*) may be arranged]. The first light-receiving element (130*a*) may be arranged at the left side of each light-receiving element pair (130*a*, 130*b*) at an angle θ—180 with reference to second side 130, and the second light-receiving element (130*b*) may be arranged at the right side of each light-receiving element pair (130*a*, 130*b*) at an angle −θ with reference to the second side 130. The angle θ with reference to the second side 130 may be greater than the angle β. According to an exemplary embodiment, the angle θ may be 45 degrees, in which case the angle between the first light-receiving element (130*a*) and the second light-receiving element (130*b*) of each light-receiving element pair (130*a*, 130*b*) is 90 degrees.

The two reflectors 120 may be arranged along two opposing sides of the rectangular position-detecting surface 150 in a widthwise (W) direction for reflecting light beams emitted by the plurality of light-emitting element pairs (110*a*, 110*b*).

In accordance with the exemplary embodiment as shown in FIG. 1A, given L=23 and W=19, each of the second light-receiving elements (130*b*) at points 0 through 4 may receive light beams emitted from the first light-emitting elements (110*a*) at points 19 through 23 respectively. Moreover, each of the first light-receiving elements (130*a*) at points 19 through 23 may receive light beams emitted from the second light-emitting elements (110*b*) at points 0 through 4 respectively. It is important to note that such transmissions of light beams are not explicitly illustrated in FIG. 1A but nevertheless are possible with respect to the optical touch panel 101 as depicted in FIG. 1A.

A control circuit (not shown) may be configured for causing the light-emitting element pairs (110a, 110b) to emit light beams in a predetermined order for the purpose of scanning the position-detecting surface 150. For instance, the light-emitting element pairs (110a, 110b) may emit light beams one-by-one in a sequential order from left to right, or a plurality of alternate light-emitting element pairs may simultaneously emit light beams at a given time. Moreover, the control circuit may be configured for causing the plurality of light-receiving element pairs (130a, 130b) to receive the light beams emitted from the plurality of light-emitting element pairs (110a, 110b). Accordingly, optical paths may be formed on the position-detecting surface 150 in a grid pattern as shown in FIG. 1A.

When an object (e.g., a pointing device such as a touch pin or a finger) is positioned at point $M_0$ on the position-detecting surface 150 as shown in FIG. 1A, the object blocks a light beam 140 emitted by one of the first light-emitting elements (110a) and reflected by one of the reflectors 120. Moreover, the object at point $M_0$ blocks a light beam 142 directly emitted by another of the first light-emitting elements (110a).

Due to the blockage of the light beam 140 and the light beam 142, two of the light-receiving elements do not receive these light beams. The two light-receiving elements that do not receive the light beams may be located at two points that respectively may be a distance 'm' and 'n' away from the left edge (i.e., point 0) of the second side 130 of the rectangular position-detecting surface 150. Accordingly, one of the two light-receiving elements not receiving a light beam may be "at a left portion" of the second side 130 and accordingly may be positioned at the point that is 'm' away from the left edge, while the other of the two light-receiving elements not receiving a light beam may be "at a right portion" of the second side 130 and accordingly may be positioned at the point that is 'n' away from the left edge. Similarly, the two light-emitting elements that correspond to the two light-receiving elements may be located at two points that respectively may be a distance 'x' and 'y' away from the left edge (i.e., point 0) of the first side 110 of the rectangular position-detecting surface 150.

Accordingly, the control circuit may be configured to determine the X/Y rectangular coordinates (A, B) of the object based on which light-receiving elements fail to receive a light beam during a scan cycle due to blockage of the light beam 140 and the light beam 142 at point $M_0$.

If the object at point $M_0$ blocks more than two light beams, the coordinates of the intended center position of the object may be determined by averaging the detected coordinate information. Such averaging may be completed by the control circuit or by another device operatively coupled to the optical touch panel 101.

In accordance with the exemplary embodiment of the Taiwan patent application No. 96151662, in order to determine the X/Y rectangular coordinates of the object positioned at point $M_0$ on the position-detecting surface 150 in the event that the object blocks two light beams, the control circuit may be configured for dividing the position-detecting surface 150 into four regions I, II, III, and IV. These four regions I, II, III, and IV may be based on whether each of the two light-receiving elements not receiving a light beam is a first light-receiving element 130a or a second light-receiving element 130b of one of the plurality of light-receiving element pairs (130a, 130b). Since the length and the width 'W' of the position-detecting surface 150 and the positions of two of the light-receiving elements that do not receive the light beams may be given, equations to determine the X/Y rectangular coordinates (A, B) of point $M_0$ respectively for the four regions I, II, III, and IV via geometric analysis can be obtained.

The problem for the optical touch panel 101, mentioned above, is that it will only be effective when a single point is detected. For example, when a user simultaneously touches two points, $M_2$ and $M_4$, on the position-detecting surface 150, the control circuit cannot determine the actual X/Y rectangular coordinates of points $M_2$ and $M_4$. The points $M_2$ and $M_4$ block four light beams, respectively as light beams 140, 142, 144 and 146. In such case, there will be six potential points (i.e. $M_0$, $M_1$, $M_2$, $M_3$, $M_4$, $M_5$) being obtained via the computation of the equations mentioned above based on the blocked light beams 140, 142, 144 and 146. Therefore, there exists other potential combinations of two points that block the same four light beams, e.g. points ($M_1$ and $M_5$) or ($M_0$ and $M_3$). Accordingly, the control circuit cannot determine the actual X/Y rectangular coordinates of points $M_2$ and $M_4$ based on which light-receiving elements fail to receive a light beam during a scan cycle due to blockage of the light beams, such as the light beams 140, 142, 144, 146. These points, except points $M_2$ and $M_4$, are not actual points and thus are defined as phantom points.

However, there are many applications requiring "multi-point" touch in order to provide users with a more friendly user interface and better interaction between people and machine, for example, Apple® iPod® Touch which provides a friendly multi-point touch interface or called a multi-touch interface. Still, in the technical field of optical touch panels, the feature of the "multi-point" touch has not been integrated thereto.

BRIEF SUMMARY

One aspect of the present invention discloses a multi-touch optical touch panel which comprises a position-detecting surface with a specified length and a specified width. Moreover, the multi-touch optical touch panel may comprise a first set of a plurality of light-emitting element pairs configured for emitting a plurality of light beams, wherein the first set of a plurality of light-emitting element pairs are arranged in pairs at various points along a first side of the position-detecting surface in a lengthwise direction. A first light-emitting element may be arranged at the left side of each light-emitting element pair at an angle 180—$\theta_1$ with reference to the first side, and a second light-emitting element may be arranged at the right side of each light-emitting element pair at an angle $\theta_1$ with reference to the first side.

Additionally, a second set of a plurality of light-emitting elements may be arranged at said various points along the first side at 90 degrees with reference to the first side. The optical touch panel may comprise two reflectors (e.g. mirrors) arranged along two opposed sides of the position-detecting surface in the widthwise direction, wherein the reflectors are configured for reflecting the plurality of light beams emitted by the first set of a plurality of light-emitting element pairs.

Furthermore, the optical touch panel may comprise a first set of a plurality of light-receiving element pairs configured for receiving the plurality of light beams emitted by the first set of a plurality of light-emitting element pairs, wherein the first set of a plurality of light-receiving element pairs are arranged in pairs at various points along a second side of the position-detecting surface opposite to the first side in a lengthwise direction. A first light-receiving element is arranged at the left side of each light-receiving element pair at an angle $\theta_1$—180 with reference to the second side, and a second light-receiving element is arranged at the right side of each light-receiving element pair at an angle $-\theta_1$ with reference to the second side.

A second set of a plurality of light-receiving elements are arranged at said various points along the second side at −90 degrees with reference to the second side for receiving the plurality of light beams emitted by the second set of plurality of light-emitting elements.

The optical touch panel may comprise a control circuit which is configured for causing the first set of light-emitting element pairs and the second set of light-emitting elements to emit the plurality of light beams in a predetermined order to scan the position-detecting surface, and further configured for causing the first set of light-receiving element pairs and the second set of light-receiving elements to receive the plurality of light beams, thereby forming optical paths on the position-detecting surface in a grid pattern.

The multi-touch optical touch panel is adapted for detecting objects positioned on the position-detecting surface, and wherein at least a portion of the plurality of light beams are blocked by the objects when the objects are positioned on the position-detecting surface, thereby hindering a portion of the plurality of light beams from reaching one of the second set of a plurality of light-receiving elements and at least one of the first or second light-receiving elements of at least one of the first set of a plurality of light-receiving element pairs.

Another aspect of the present invention discloses a method of determining actual coordinates of objects positioned on a position-detecting surface of a multi-touch optical touch panel, comprising: detecting, for angle θi, all light-receiving elements that do not receive light beams during a scan cycle due to the blockage of the light beams by objects and the distances of the light-receiving elements away from the left edge of the rectangular position-detecting surface; obtaining all potential combinations by selecting any two of all light-receiving elements that do not receive the light beams in order to determine all potential positions of objects, and separately computing touch coordinates of all potential positions of objects to create a set of the coordinates of objects; repeating the previous steps for next θi; and retrieving an intersection from all sets of coordinates of all potential positions of objects created for different angle θi in order to obtain the actual coordinates of objects, after all computations for all θi are finished.

Still another aspect of the present invention discloses a method of arranging a first set and a third set of a plurality of light-emitting element pairs and a second set of a plurality of light-emitting elements on a frame-shaped circuit board that surrounds the perimeter of a position-detecting surface, comprising: arranging the first set of a plurality of light-emitting element pairs on a first surface of the frame-shaped circuit board in pairs at various points along a first side of the position-detecting surface in a lengthwise direction, in which a first light-emitting element is arranged at the left side of each of the first set of light-emitting element pairs at an angle 180—$\theta_1$ with reference to a first side, and a second light-emitting element is arranged at the right side of each of the first set of light-emitting element pairs at an angle $\theta_1$ with reference to the first side; arranging the third set of plurality of light-emitting element pairs on a second surface of the frame-shaped circuit board in pairs at various points along the first side of the position-detecting surface in the lengthwise direction, in which a first light-emitting element is arranged at the left side of each of the third set of light-emitting element pairs at an angle 180—$\theta_2$ with reference to the first side, and a second light-emitting element is arranged at the right side of each of the third set of light-emitting element pairs at an angle $\theta_2$ with reference to the first side; and arranging the second set of a plurality of light-emitting elements on the first surface of the frame-shaped circuit board, in which each light-emitting element is arranged at said various points along the first side at 90 degrees with reference to the first side; wherein there does not exist a multiple relationship among the angle $\theta_2$, 90 degrees and the angle $\theta_1$.

BRIEF DESCRIPTION OF THE SEVERAL VIEWS OF THE DRAWINGS

Embodiments of the invention will next be described, by way of example only, with reference to the accompanying drawings in which.

DETAILED DESCRIPTION

The following describes various exemplary embodiments. The disclosed embodiments are only for illustration. Thus, it will be understood by those skilled in the art that there are many modifications that may be made to the various embodiments described herein without departing from the spirit and scope of the disclosure. Throughout the drawings, similar features are identified by similar reference numerals.

Figure 1B:
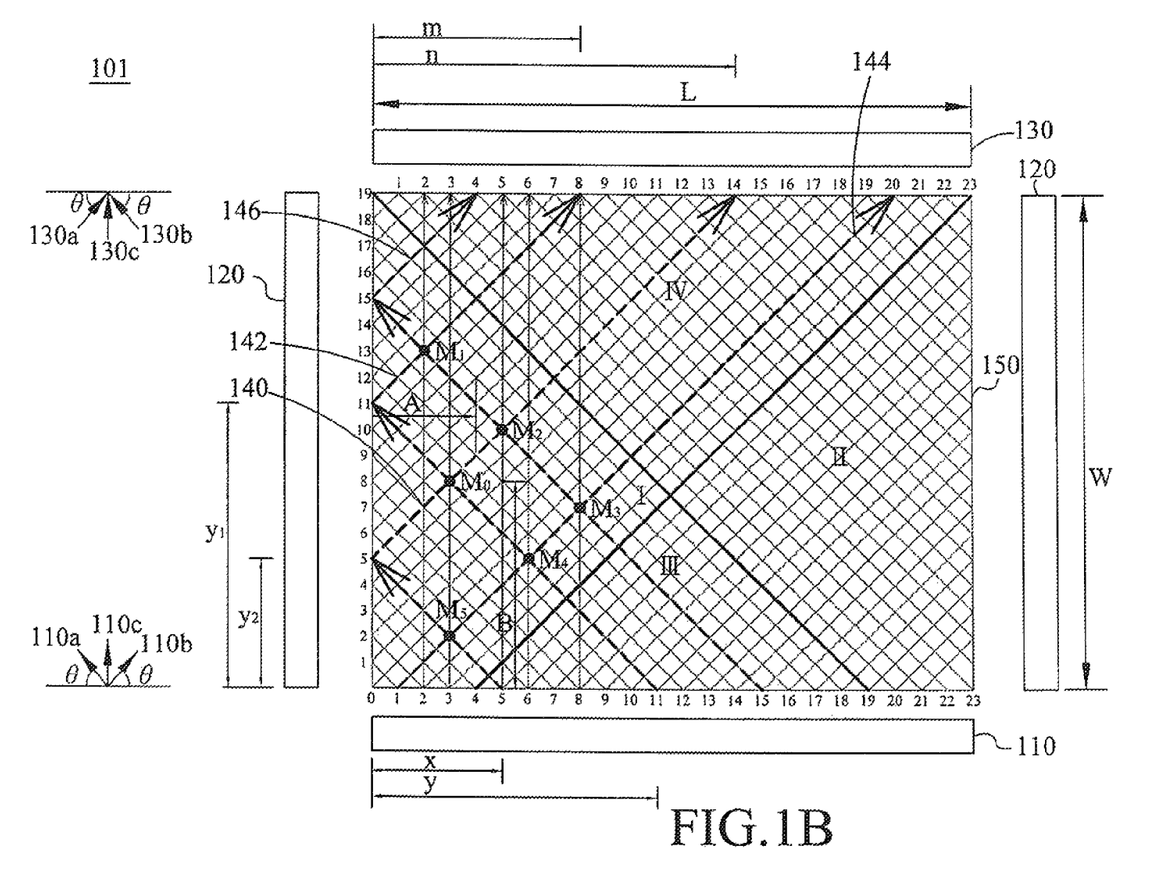
FIG. 1B is a schematic diagram of the construction of a multi-touch optical touch panel formed by improving that of FIG. 1A to provide the detection of two-point touch.

With reference to FIG. 1B, a schematic diagram of the construction of a multi-touch optical touch panel formed by improving that of FIG. 1A to provide the detection of two-point touch is provided. As illustrated, to the touch panel 101 in FIG. 1B includes the plurality of light-emitting element pairs (110a, 110b) and the plurality of light-receiving element pairs (130a, 130b) that may be respectively arranged in pairs, as shown in FIG. 1A, at the various points (e.g., point 0, point 1 . . . point L) along the first side 110 of the rectangular position-detecting surface 150 in a lengthwise (L) direction and the various points (e.g., point 0, point 1 ... point L) along a second side 130 opposite to the first side 110, respectively. However, a plurality of light-emitting elements 110c and a plurality of light-receiving elements 130c may be further arranged, respectively, at a various points along the first side 110 and the second side 130. The plurality of light-emitting elements 110c may be arranged at the various points (e.g., point 0, point 1 ... point L) along the first side 110 at an angle 90 with reference to the first side 110, while the plurality of light-receiving elements 130c may be arranged at the various points (e.g., point 0, point 1 ... point L) along the second side 130 at an angle (−90) with reference to the second side 130.

In such a situation, as shown in FIG. 1B, each of the six points ($M_0$, $M_1$, $M_2$, $M_3$, $M_4$, $M_5$) shown in FIG. 1A has three light beams passing through during a scan cycle. If a user simultaneously touches two points, $M_2$ and $M_4$, on the position-detecting surface 150, as with the aforementioned case, there will be other combinations of two points selected from the six points(i.e. $M_0$, $M_1$, $M_2$, $M_3$, $M_4$, $M_5$) that block the same four light beams, respectively as light beams 140, 142, 144 and 146, for example, points ($M_1$ and $M_5$) or ($M_0$ and $M_3$) mentioned above. However, only those light-receiving elements 130c that are positioned at point 5 and point 6 fail to receive a light beam during a scan cycle due to blockage of the light beams only emitted by the light-emitting elements 110c positioned at point 5 and point 6. Accordingly, the control circuit may be configured to determine the actual X/Y rectangular coordinates (A, B) of the objects M2 and $M_4$ further based on which light-receiving elements 130c fail to receive a light beam during a scan cycle due to blockage of the light beams emitted by the light-emitting elements 110c. Considering the special case only provided for detecting two-point touch on the position-detecting surface mentioned above, the present invention may be broadened to determine the actual coordinates of (n−1) objects that simultaneously touch (n−1) points if each point on the position-detecting surface 150 has (n) light beams passing through during a scan cycle.

A control circuit (not shown) may be configured for causing the light-emitting elements (110a, 110b, 110c) to emit light beams in a predetermined order for the purpose of scanning the position-detecting surface 150, and also causing the light-receiving elements (130a, 130b, 130c) positioned opposite to the respective light-emitting elements to receive the light beams emitted from the light-emitting element pairs (110a, 110b, 130c). Accordingly, optical paths may be formed on the position-detecting surface 150 in a grid pattern to determine the X/Y rectangular coordinates of the two touch points.

Now refer back to FIG. 1B, if a user simultaneously touches two points, $M_0$ and $M_5$, on the position-detecting surface 150, in such case, both point $M_0$ and $M_5$ are located on the same optical path formed by the light beam emitted by the light-emitting element 110c positioned at point 3. The control circuit cannot determine at which point, $M_0$ or $M_5$, an object blocks a light beam emitted by the light-emitting elements 110c positioned at point 3. Accordingly, the construction of an optical touch panel shown in FIG. 1B cannot determine the actual X/Y rectangular coordinates of objects (or touches), when there are "phantom" points presented on the same optical path formed by the light beam emitted by the light-emitting elements 110c. The reason that there are "phantom" points presented on the same optical path is that there exists a multiple relationship between the angle θ (90 degrees) used for arranging light-emitting element 110c and the angle θ (45 degrees) used for arranging the plurality of light-emitting element pairs (110a, 110b) in the embodiments as illustrated in FIG. 1A and FIG. 1B.

Figure 2A:
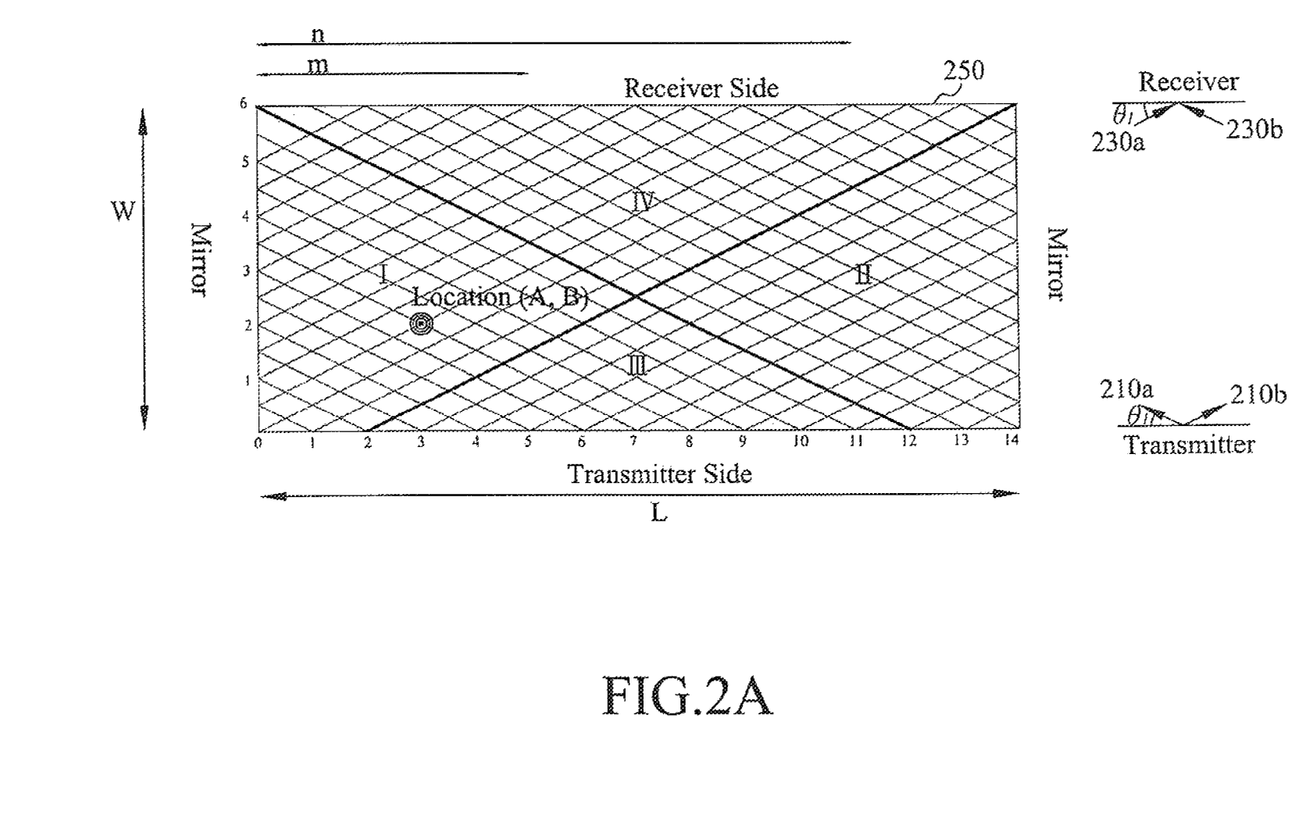
FIG. 2A and FIG. 2B are a schematic diagram of the construction of a multi-touch optical touch panel solving the problem of FIG. 1B.
Figure 2B:
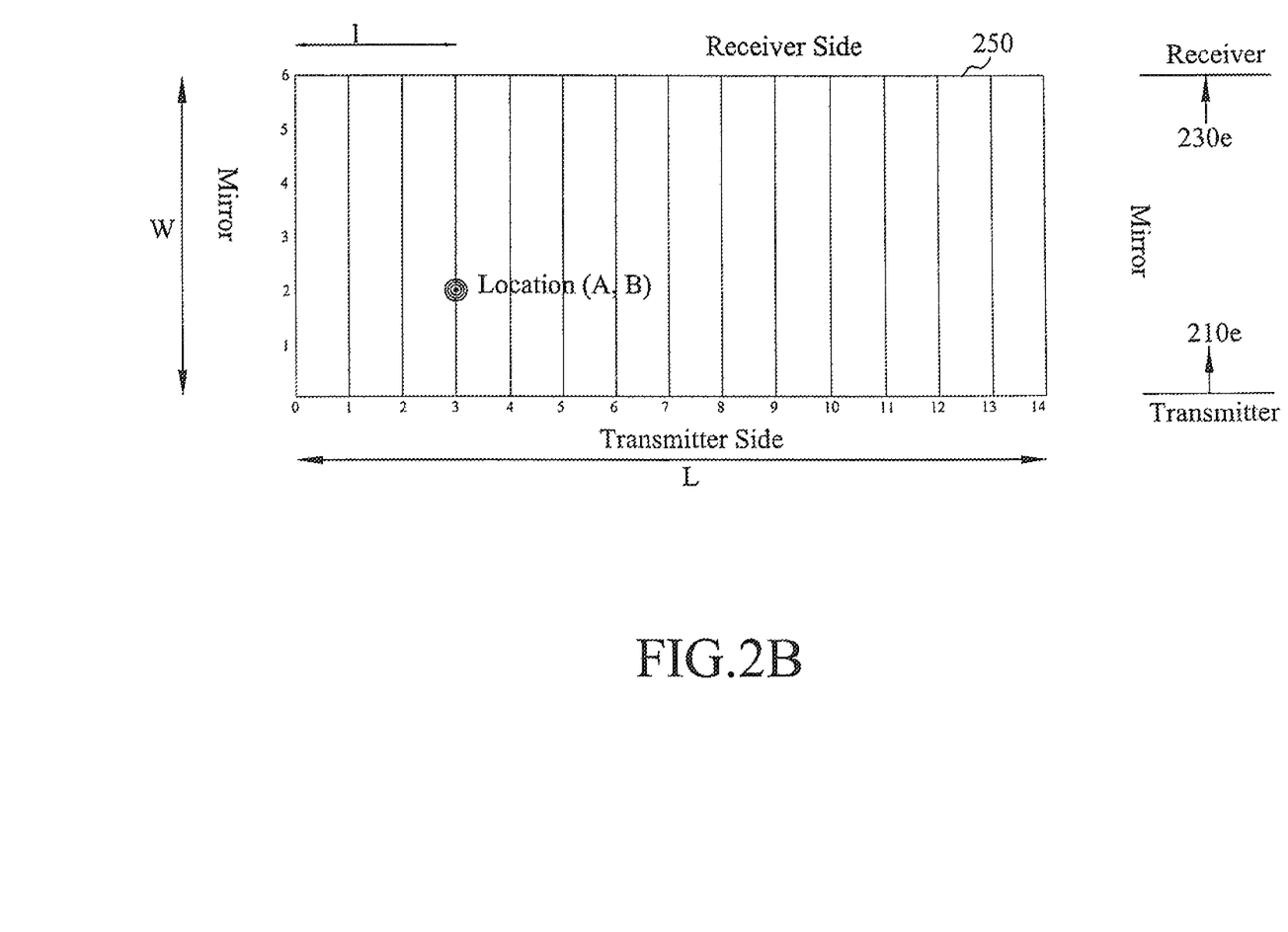

With reference to FIG. 2A and FIG. 2B, a schematic diagram of the construction of a multi-touch optical touch panel solving the problem of FIG. 1B is provided. As illustrated in FIG. 2A, the plurality of light-emitting element pairs (210a, 210b) may be arranged in pairs at various points (e.g., point 0, point 1 ... point 14) along a first side respectively at an angle (180—$θ_1$) and an angle $θ_1$ with reference to the first side of the rectangular position-detecting surface 250 in a lengthwise (L) direction, while the plurality of light-emitting elements 210e may be arranged at various points (e.g., point 0, point 1 ... point 14) along the first side at an angle $θ_3$ (i.e. 90 degrees) with reference to the first side (as shown in FIG. 2B). Similarly, the plurality of light-receiving element pairs (230a, 230b) may be arranged in pairs at various points (e.g., point 0, point 1 ... point 14) along a second side opposite to the first side respectively at an angle ($θ_1$—180) and an angle (−$θ_1$) with reference to the second side of the rectangular position-detecting surface 250 in a lengthwise (L) direction, while the plurality of light-receiving elements 230e may be arranged at various points (e.g., point 0, point 1 ... point 14) along the second side at an angle −$θ_3$ (i.e. −90 degrees) with reference to the second side (as shown in FIG. 2B).

There does not exist a multiple relationship between the angle θ3 (90 degrees) used for arranging light-emitting element 210e and the angle θ1 (which is not 45 degrees) used for arranging the plurality of light-emitting element pairs (210a, 210b) in the embodiments as illustrated in FIG. 2A and FIG. 2B. Accordingly, the problem that there are "phantom" points presented on the same optical path is solved.

Similar to the aforementioned exemplary embodiment of the Taiwan patent application No. 96151662, when an object is positioned at point M on the position-detecting surface 250 of the optical touch panel as shown in FIG. 2A, the object blocks two light beams, thereby hindering the two light beams from reaching two light-receiving elements positioned opposite to the light-emitting elements. A control circuit (not shown) may be configured for dividing the position-detecting surface 250 into four regions I, II, III, and IV. These four regions I, II, III, and IV may be based on whether each of the two light-receiving elements not receiving a light beam is a first light-receiving element 230a or a second light-receiving element 230b of one of the plurality of light-receiving element pairs (230a, 230b).

The angle $θ_1$ will not be 45 degrees as disclosed in the exemplary embodiment of the Taiwan patent application No. 96151662. However, as previously discussed, there may be two light-receiving elements that do not receive light beams due to blockage by the object at point M, and these two light-receiving elements may be located at two points that are respectively a distance 'm' and 'n' away from the left edge of the second side of the position-detecting surface 250 with length 'L' and width 'W'. Taking into account the parameters (L, W, m, n, $θ_1$) and the four regions I, II, III, and IV of the position-detecting surface 250, the control circuit may be configured to compute via geometric analysis the X/Y rectangular coordinates (A, B) of the point M. Such computation may be carried out through the use of four equations, wherein the equation used in a given case depends on which of the four regions the object is located. The X/Y rectangular coordinates (A, B) may be computed via the following:

If the two light-receiving elements that do not receive a light beam during a scan cycle are both first light-receiving elements (230a), then the object at point M is positioned within the region I of the position-detecting surface 250. The equation to determine the X/Y rectangular coordinates (A, B) when the object is positioned within the region I is the following:

$$(A, B) = \left(\left|\frac{n-m}{2}\right|, W - \frac{n+m}{2}\tan\theta 1\right)$$

If the two light-receiving elements that do not receive a light beam during a scan cycle are both second light-receiving elements (230b), then the object is positioned at a point M within the region II of the position-detecting surface 350. The equation to determine the X/Y rectangular coordinates (A, B) when the object is positioned within the region II is the following:

$$(A, B) = \left(L - \left|\frac{n-m}{2}\right|, (W - L\tan\theta 1) + \frac{n+m}{2}\tan\theta 1\right)$$

If the light-receiving element at a left portion of the second side of the position-detecting surface 250 that does not receive a light beam during a scan cycle is a first light-receiving element (230a), and the light-receiving element at a right portion of the second side of the position-detecting surface 250 that does not receive a light beam is a second light-receiving element (230b), then the object is positioned at a point M within the region III of the position-detecting surface 250. The equation to determine the X/Y rectangular coordinates (A, B) when the object is positioned within the region III is the following:

$$(A, B) = \left(L - \frac{n+m}{2}, (W - L) + \left|\frac{n-m}{2}\right|\tan\theta 1\right)$$

If the light-receiving element at a left portion of the second side of the position-detecting surface 250 that does not receive a light beam during a scan cycle is a second light-receiving element (230b), and the light-receiving element at a right portion of the second side of the position-detecting surface 250 that does not receive a light beam is a first light-receiving element (230a), then the object is positioned at point M within the region IV of the position-detecting surface 250. The equation to determine the X/Y rectangular coordinates (A, B) when the object is positioned within the region IV is the following:

$$(A, B) = \left(\frac{n+m}{2}, W - \left|\frac{n-m}{2}\right|\tan\theta 1\right)$$

The X/Y rectangular coordinates (A, B) of a 'single' object M may be determined uniquely via the computing mentioned above. FIG. 2A and FIG. 2B are schematic diagrams of the construction of a multi-touch optical touch panel provided merely for two-point touch. If a user simultaneously touches two points on the position-detecting surface 250 as shown in FIG. 2A, the two points will block four light beams. In such case, there will be six potential points being obtained via the computation of the equations mentioned above based on the blocked light beam.

Figure 3:
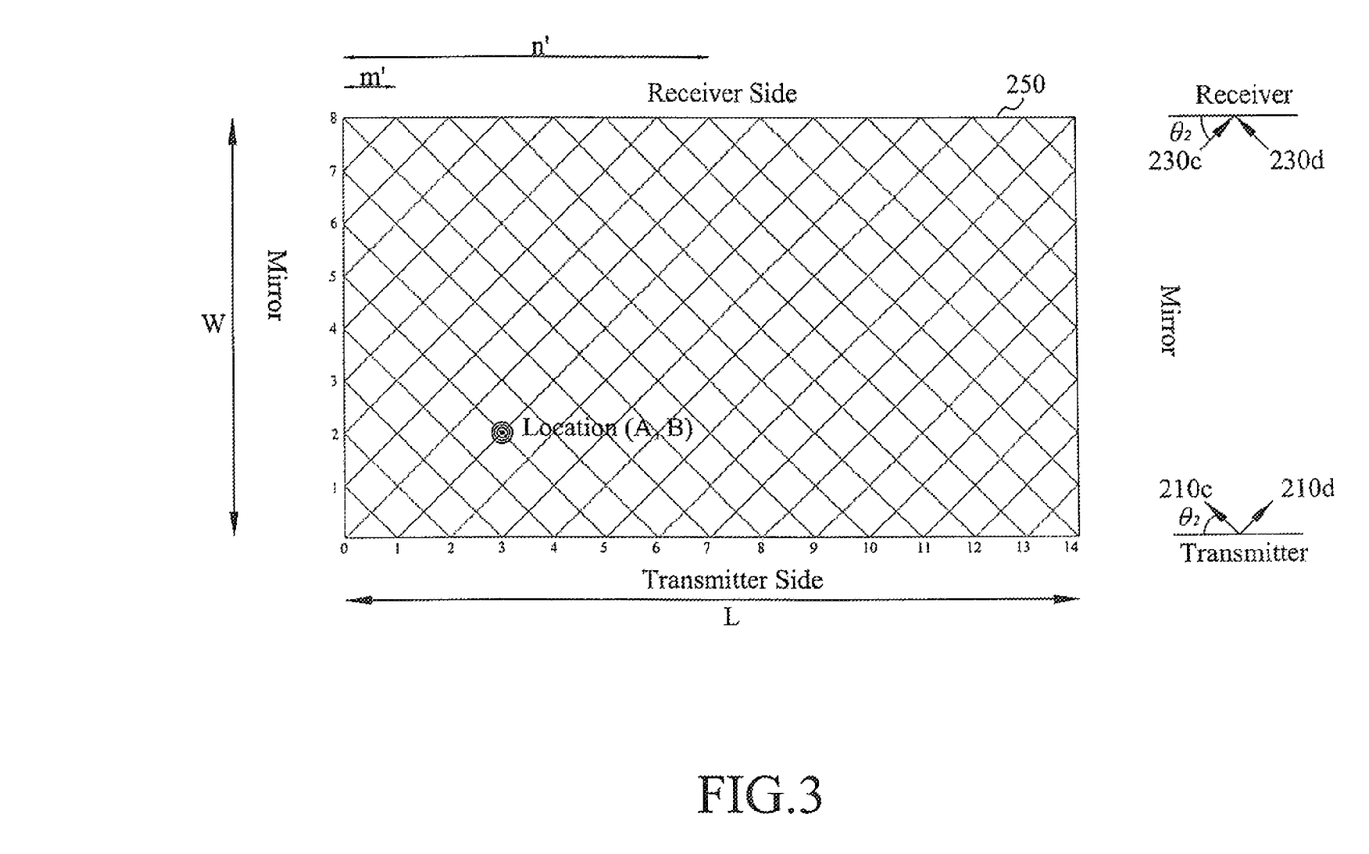
FIG. 3 is a schematic diagram of arranging the added plurality of light-emitting element pairs (210c, 210d) and the corresponding plurality of light-receiving element pairs (230c, 230d) for the construction of a multi-touch optical touch panel provided for detecting four-point touch according to one embodiment of the present invention.

According to the rule mentioned above, the actual coordinates of (n−1) objects that simultaneously touch (n−1) points can be determined if each point on the position-detecting surface has (n) light beams passing through during a scan cycle. Accordingly, the construction of a multi-touch optical touch panel provided for detecting four-point touch can be made by further adding other light-emitting elements and corresponding light-receiving elements on the position-detecting surface 250 as shown in FIG. 2A and FIG. 2B, in order to obtain six potential points via the computation of the equations mentioned above based on the blocked light beam for extracting the actual touch points and determine the actual coordinates of objects or touches when requiring four-point touch. FIG. 3 is a schematic diagram of arranging the added plurality of light-emitting element pairs (210c, 210d) and the corresponding plurality of light-receiving element pairs (230c, 230d) on the position-detecting surface 250 for the construction of a multi-touch optical touch panel provided for detecting four-point touch. The details of how to arrange the plurality of light-emitting element pairs (210a, 210b, 210c, 210d) and the plurality of light-emitting elements 210e, and the plurality of light-receiving element pairs (230a, 230b, 230c, 230d) and the plurality of light-receiving elements 230e on the same position-detecting surface will be described later with reference to FIG. 4 to FIG. 7.

As illustrated in FIG. 3, other light-emitting elements and corresponding light-receiving elements with an angle $\theta_2$ other than the angle $\theta_1$ are added on the position-detecting surface 250 shown in FIG. 2A and FIG. 2B that provide the construction of a multi-touch optical touch panel provided for detecting two-point touch. The added plurality of light-emitting element pairs (210c, 210d) may be arranged in pairs at various points (e.g., point 0, point 1 . . . point 14) along a first side respectively at an angle (180—$\theta_2$) and an angle $\theta_2$ with reference to the first side of the rectangular position-detecting surface 250 in a lengthwise (L) direction. Similarly, the corresponding plurality of light-receiving element pairs (230c, 230d) may be arranged in pairs at various points (e.g., point 0, point 1 . . . point 14) along a second side opposite to the first side respectively at an angle ($\theta_2$—180) and an angle (−$\theta_2$) with reference to the second side of the rectangular position-detecting surface 250 in a lengthwise (L) direction. There does not exist a multiple relationship among the angle $\theta_2$, the angle $\theta_3$ (90 degrees) used for arranging light-emitting element 210e and the angle $\theta_1$ (which is not 45 degrees) used for arranging the plurality of light-emitting element pairs (210a, 210b) in the embodiments as illustrated in FIG. 2A and FIG. 2B. That is, the angle $\theta_2$ is also not 45 degrees. Accordingly, there will be no "phantom" points presented on the same optical path. In such situation, the construction of the multi-touch optical touch panel by integrating FIG. 2A, FIG. 2B and FIG. 3 may be used to identify four objects that simultaneously touch four points, and determine actual coordinates thereof. The details of how to determine these four points will be described later with reference to FIG. 7.

Figure 4:
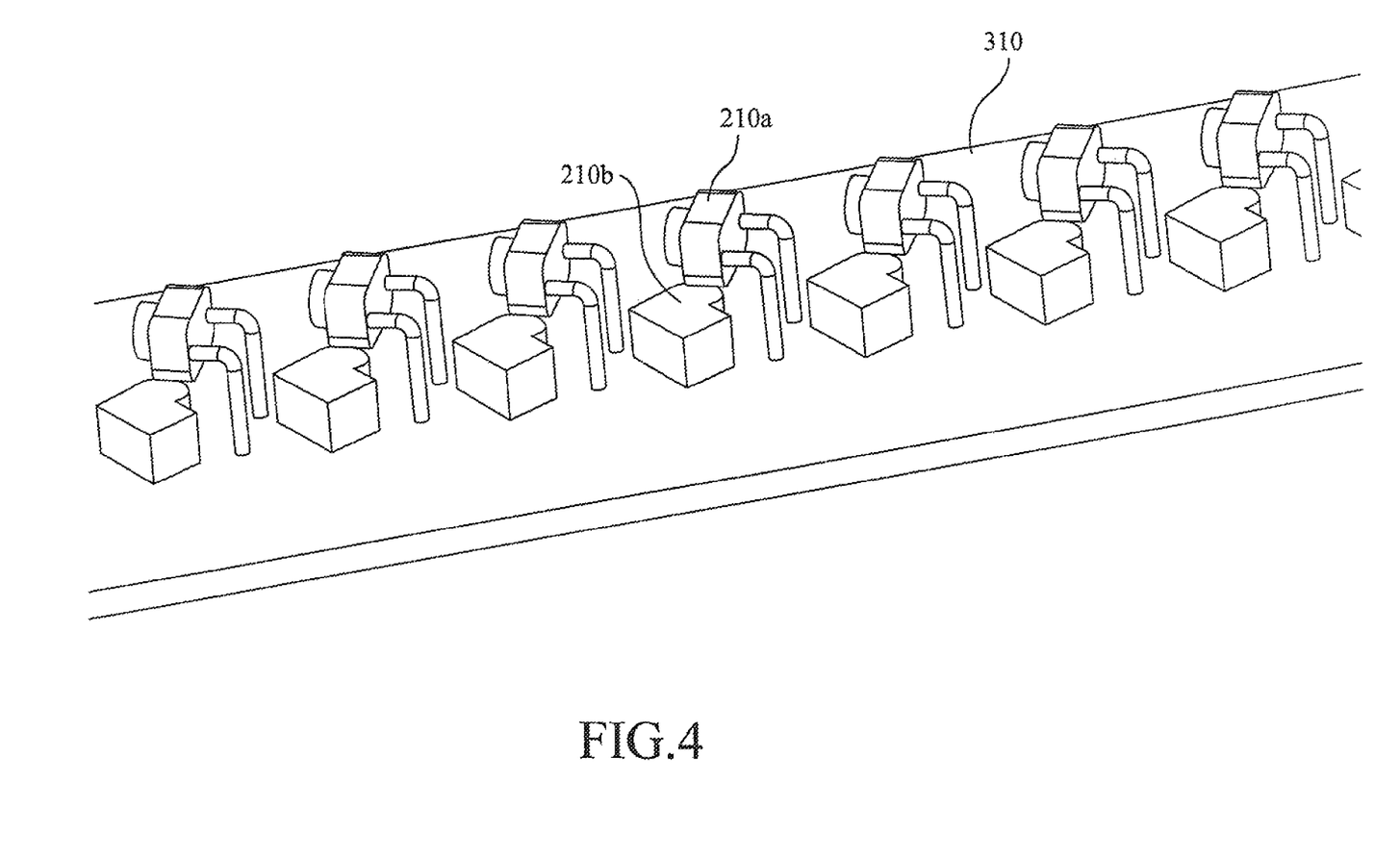
FIG. 4 is a top perspective view of arranging the plurality of light-emitting element pairs (210a, 210b) according to the construction of a multi-touch optical touch panel provided for detecting four-point touch of the present invention.
Figure 5:
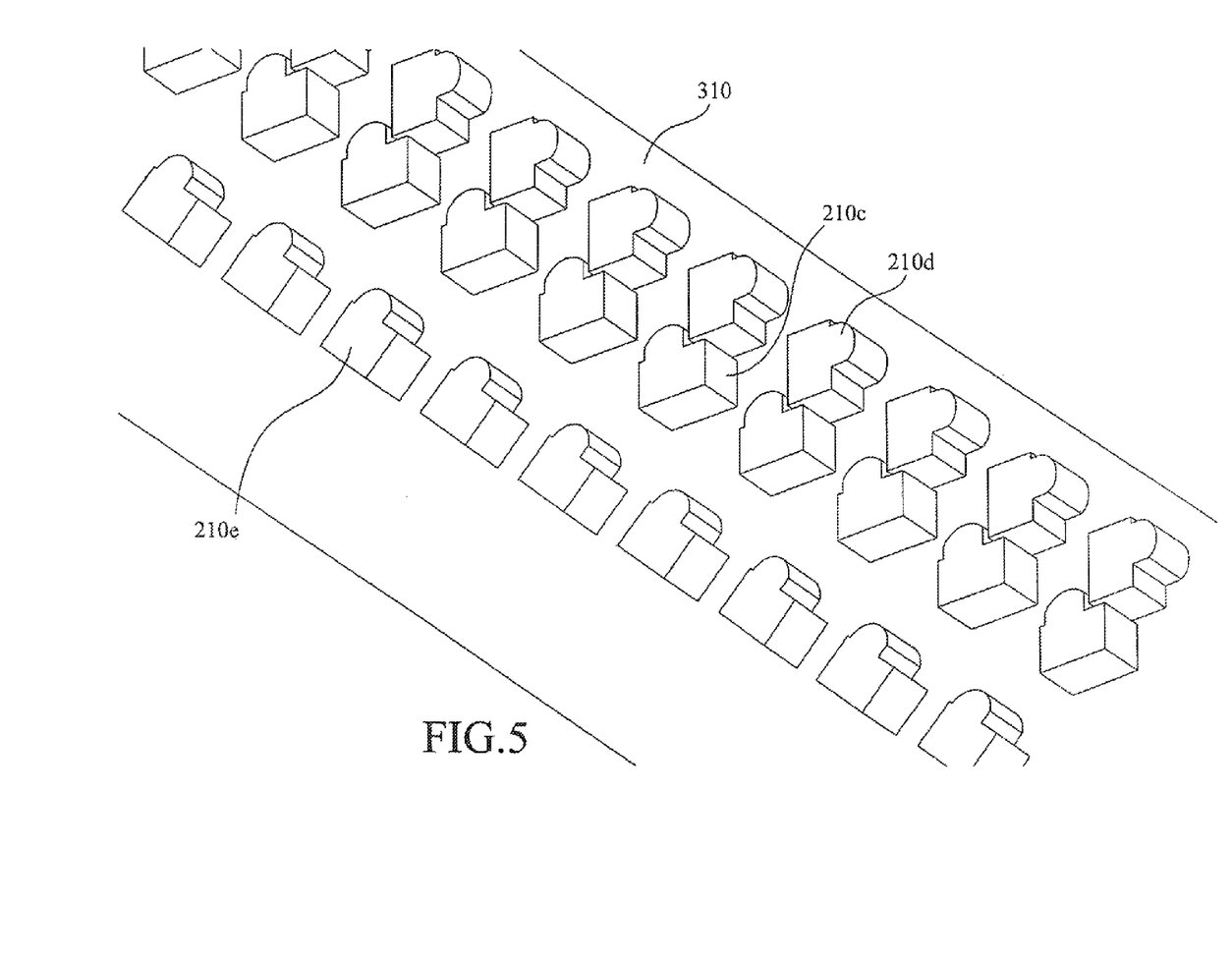
FIG. 5 is a bottom perspective view of the plurality of light-emitting element pairs (210c, 210d, 210e) according to the construction of a multi-touch optical touch panel provided for detecting four-point touch of the present invention.
Figure 6:
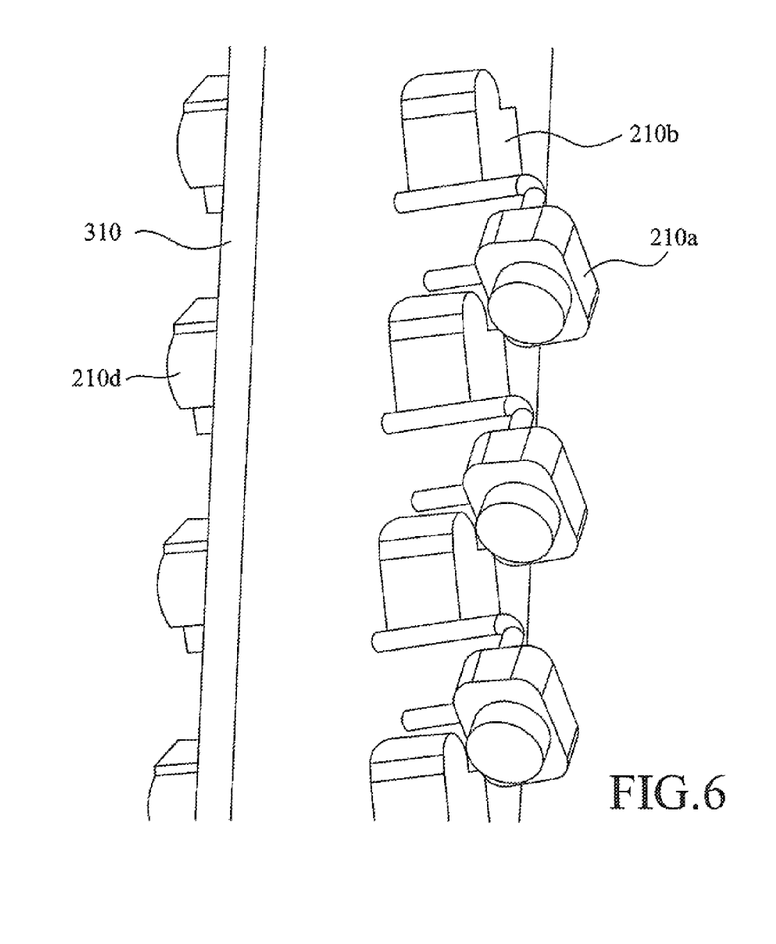
FIG. 6 is a side perspective view of the multi-touch optical touch panel according to the construction of a multi-touch optical touch panel provided for detecting four-point touch of the present invention.

FIG. 4, FIG. 5 and FIG. 6 respectively show an assembled perspective view of how to arrange the first set of a plurality of light-emitting element pairs (210a, 210b; see FIG. 2A), the third set of plurality of light-emitting element pairs (210c, 210d; see FIG. 3), and the second set of a plurality of light-emitting elements (210e; see FIG. 2B). FIG. 4 is a top perspective view of a first side (transmitter side; see FIGS. 2A, 2B and 3) of a frame-shaped circuit board 310 arranging the first set of a plurality of light-emitting element pairs (210a, 210b), FIG. 5 is a bottom perspective view of the first side of the frame-shape circuit board 310 arranging the third set of a plurality of light-emitting element pairs (210c, 210d) and the second set of a plurality of light-emitting elements (210e), and FIG. 6 is a side perspective view of the multi-touch optical touch panel. As shown in FIG. 6, the first set of a plurality of light-emitting element pairs (210a, 210b) and the third set of a plurality light-emitting element pairs (210c, 210d) may be respectively arranged on the top surface and bottom surface of the first side of the frame-shaped circuit board 310. The first set of a plurality of light-receiving element pairs (see 230a, 230b in FIG. 2A), third set of a plurality of light-receiving element pairs (see 230c, 230d in FIG. 3), and the second set of a plurality of light-receiving elements (see 230e in FIG. 2B) may be similarly arranged on the top and bottom surfaces along an opposing second side (receiver side; see FIGS. 2A, 2B and 3) of the frame-shaped circuit board 310 consistent with FIGS. 2A, 2B and 3. Accordingly, the first and third sets of a plurality of light-emitting elements pairs, the second set of a plurality of light-emitting element pairs, the first and third sets of a plurality of light-receiving element pairs and the second set of a plurality of light-receiving elements are affixed to opposing (transmitter and receiver) sides of the frame-shaped circuit board 310 that surrounds the perimeter of the position-detecting surface 250 and is positioned above the position-detecting surface 250.

Figure 7:
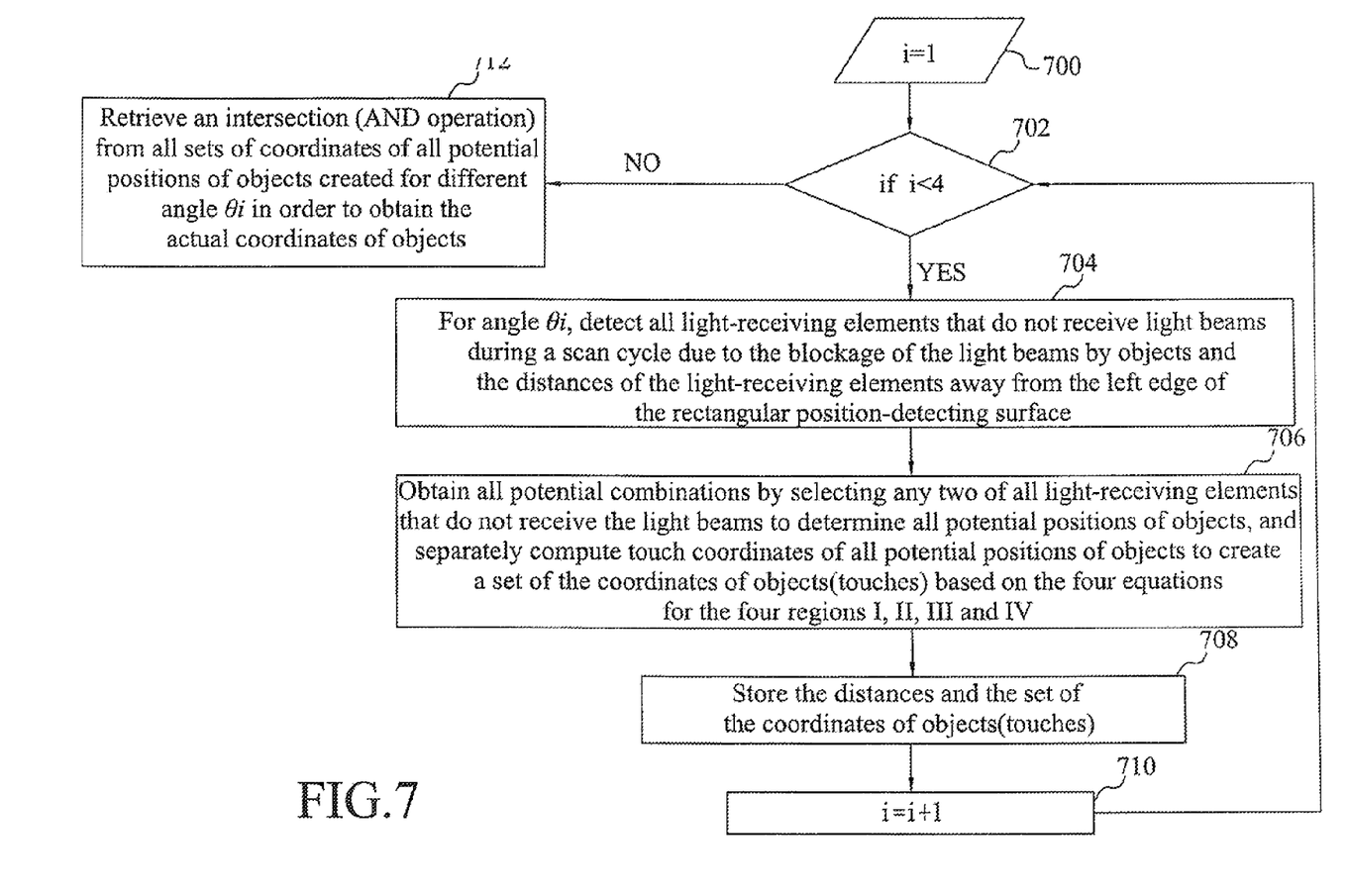
FIG. 7 is a flowchart of determining actual coordinates of objects or touches positioned on a position-detecting surface of a multi-touch optical touch panel provided for detecting four-point touch.

FIG. 7 is a flowchart of determining actual coordinates of objects or touches positioned on a position-detecting surface of a multi-touch optical touch panel provided for detecting four-point touch. The process starts in step 704, in which for angle $\theta i$, the panel detects all light-receiving elements that do not receive light beams during a scan cycle due to the blockage of the light beams by objects (touches) and the distances of the light-receiving elements away from the left edge of the rectangular position-detecting surface (As illustrated in FIG. 2A, two light-receiving elements that do not receive the light beams may be located at two points that respectively may be a distance 'm' and 'n' away from the left edge of the rectangular position-detecting surface.). The panel will obtain all potential combinations by selecting any two of all light-receiving elements that do not receive the light beams in order to determine all potential positions of objects, and separately compute touch coordinates of all potential positions of objects to create a set of the coordinates of objects (touches) based on the four equations for the four regions I, II, III and IV (step 706). In step 708, the distances and the set of the coordinates of objects (touches) will be stored. Thereafter, the process will repeat the previous steps for next $\theta i$ (step 710). According to the exemplary embodiment, the multi-touch optical touch panel is designed for detecting four-point touch, each point on the panel only needs five light beams passing through during a scan cycle and three angles $\theta i$. Therefore, when i=4, the process will proceed to step 712 to retrieve an intersection from all sets of coordinates of all potential positions of objects created for different angle $\theta i$ in order to obtain the actual coordinates of objects.

Various modifications and rearrangements may be made to the various embodiments without departing from the scope of the disclosure. For example, according to the disclosed exemplary embodiment of the present invention, a multi-touch optical touch panel can be broadened for detecting more than four-point touch by further adding other light-emitting elements and corresponding light-receiving elements on the position-detecting surface 250 as shown in FIG. 2A and FIG. 2B, in order to extract the actual touch points and determine the actual coordinates of objects or touches when requiring more than four-point touch. Thus, those skilled in the art will appreciate that using a different construction for multi-point touch is possible without materially departing from the novel teachings and advantages of the various embodiments.

The illustration of the various embodiments herein with reference to the drawings is provided for a better understanding of the characteristics and spirit of these embodiments. It will be understood that the various embodiments are not limited to the particular exemplary embodiment described herein but rather are capable of various modifications and rearrangements without departing from their scope. Therefore, it is intended that the following claims, accompanied by detailed descriptions giving the broadest explanation, not only define the scope of the various embodiments but also cover all such modifications and changes as fall within their true spirit and scope.

What is claimed is:

1. A multi-touch optical touch panel, comprising:
   a position-detecting surface with a specified length and a specified width;
   a first set of a plurality of light-emitting element pairs configured for emitting a plurality of light beams, wherein the first set of light-emitting element pairs are arranged at various points along a first side of the position-detecting surface in a lengthwise direction, and wherein
   a first light-emitting element is arranged at the left side of each light-emitting element pair in the first set of light-emitting element pairs at an angle $180 - \theta_1$ with reference to the first side, and
   a second light-emitting element is arranged at the right side of each light-emitting element pair in the first set of light-emitting element pairs at an angle $\theta_1$ with reference to the first side;
   a second set of a plurality of light-emitting elements are arranged at said various points along the first side at 90 degrees with reference to the first side;
   two reflectors arranged along two opposed sides of the position-detecting surface in the widthwise direction, wherein the reflectors are configured for reflecting the plurality of light beams emitted by the first set of light-emitting element pairs;
   a first set of a plurality of light-receiving element pairs configured for receiving the plurality of light beams emitted by the first set of light-emitting element pairs, wherein the first set of light-receiving element pairs are arranged at various points along a second side of the position-detecting surface opposite to the first side in a lengthwise direction, and wherein
   a first light-receiving element is arranged at the left side of each light-receiving element pair in the first set of light-receiving element pairs at an angle $\theta_1 - 180$ with reference to the second side, and
   a second light-receiving element is arranged at the right side of each light-receiving element pair in the first set of light-receiving element pairs at an angle $-\theta_1$ with reference to the second side;
   a second set of a plurality of light-receiving elements are arranged at said various points along the second side at $-90$ degrees with reference to the second side for receiving the plurality of light beams emitted by the second set of light-emitting elements;
   a control circuit is configured for causing the first set of light-emitting element pairs and the second set of light-emitting elements to emit the plurality of light beams in a predetermined order to scan the position-detecting surface, configured for determining coordinates of the objects positioned on the position-detecting surface and further configured for causing the first set of light-receiving element pairs and the second set of light-receiving elements to receive the plurality of light beams, thereby forming optical paths on the position-detecting surface in a grid pattern;
   a third set of a plurality of light-emitting element pairs configured for emitting a plurality of light beams, wherein the third set of light-emitting element pairs are arranged in pairs at various points along a first side of the position-detecting surface in a lengthwise direction, and wherein a first light-emitting element is arranged at the left side of each light-emitting element pair in the third set of light-emitting element pairs at an angle 180−θ₂ with reference to the first side, and a second light-emitting element is arranged at the right side of each light-emitting element pair in the third set of light-emitting element pairs at an angle θ₂ with reference to the first side;

a third set of a plurality of light-receiving element pairs configured for receiving the plurality of light beams emitted by the third set of light-emitting element pairs, wherein the third set of light-receiving element pairs are arranged in pairs at various points along a second side of the position-detecting surface opposite to the first side in a lengthwise direction, and wherein a first light-receiving element is arranged at the left side of each light-receiving element pair in the third set of light-receiving element pairs at an angle θ₂−180 with reference to the second side, and a second light-receiving element is arranged at the right side of each light-receiving element pair in the third set of light-receiving element pairs at an angle −θ₂ with reference to the second side; and wherein there does not exist a multiple relationship among the angle θ₂, 90 degrees and the angle θ₁, and wherein the multi-touch optical touch panel is adapted for detecting objects positioned on the position-detecting surface, and wherein at least a portion of the plurality of light beams are blocked by the objects when the objects are positioned on the position-detecting surface, thereby hindering the portion of the plurality of light beams from reaching one of the second set of light-receiving elements and at least one of the first or second light-receiving elements of at least one of the first set of light-receiving element pairs.

2. The multi-touch optical touch panel of claim 1, wherein:

the control circuit is configured for dividing the position-detecting surface into four regions I, II, III, and IV, which are based on whether each of two light-receiving elements not receiving a light beam is a first light-receiving element or a second light-receiving element of one of the first set of plurality of light-receiving element pairs; and the control circuit is configured for computing the coordinates of the object positioned on the position-detecting surface via the following:

if the two light-receiving elements that do not receive a light beam during a scan cycle are both first light-receiving elements, then the object is positioned within the region I of the position-detecting surface, and the equation to determine the coordinates is the following:

$$(A, B) = \left(\left|\frac{n-m}{2}\right|, W - \frac{n+m}{2}\tan\theta 1\right)$$

if the two light-receiving elements that do not receive a light beam during a scan cycle are both second light-receiving elements, then the object is positioned within the region II of the position-detecting surface, and the equation to determine the coordinates is the following:

$$(A, B) = \left(L - \left|\frac{n-m}{2}\right|, (W - L\tan\theta 1) + \frac{n+m}{2}\tan\theta 1\right)$$

if the light-receiving element at a left portion of the second side of the position-detecting surface that does not receive a light beam during a scan cycle is a first light-receiving element, and the light-receiving element at a right portion of the second side of the position-detecting surface that does not receive a light beam is a second light-receiving element, then the object is positioned within the region III of the position-detecting surface, and the equation to determine the coordinates is the following:

$$(A, B) = \left(L - \frac{n+m}{2}, (W - L) + \left|\frac{n-m}{2}\right|\tan\theta 1\right)$$

if the light-receiving element at a left portion of the second side of the position-detecting surface that does not receive a light beam during a scan cycle is a second light-receiving element, and the light-receiving element at a right portion of the second side of the position-detecting surface that does not receive a light beam is a first light-receiving element, then the object is positioned within the region IV of the position-detecting surface, and the equation to determine the coordinates is the following:

$$(A, B) = \left(\frac{n+m}{2}, W - \left|\frac{n-m}{2}\right|\tan\theta 1\right)$$

wherein '(A, B)' corresponds to the Cartesian coordinates of the object and 'm' and 'n' respectively correspond to distances of the two light-receiving elements not receiving a light beam during a scan cycle away from a left edge of the second side of the position-detecting surface, and 'm' is the distance of the left light-receiving element not receiving a light beam away from the left edge of the second side, while 'n' is the distance of the right light-receiving element not receiving a light beam away from the left edge of the second side.

3. The multi-touch optical touch panel of claim 1, wherein the control circuit is configured to cause the light-emitting element pairs to emit the plurality of light beams one-by-one in a sequential order from left to right, right to left, or to cause a plurality of alternate light-emitting element pairs to emit the plurality of light beams at a given time.

4. The multi-touch optical touch panel of claim 1, wherein the plurality of light-emitting elements comprise light emitting diodes.

5. The multi-touch optical touch panel of claim 1, wherein the plurality of light-receiving elements comprise photo transistors.

6. The multi-touch optical touch panel of claim 1, wherein:

the control circuit is configured for dividing the position-detecting surface into four regions I, II, III, and IV, which are based on whether each of two light-receiving elements not receiving a light beam is a first light-receiving element or a second light-receiving element of one of the third set of light-receiving element pairs; and the control circuit is configured for computing the coordinates of the object positioned on the position-detecting surface via the following:

if the two light-receiving elements that do not receive a light beam during a scan cycle are both first light-receiving elements in the third set of light-receiving element pairs, then the object is positioned within the region I of the position-detecting surface, and the equation to determine the coordinates is the following:

$$(A, B) = \left(\left|\frac{n-m}{2}\right|, W - \frac{n+m}{2}\tan\theta 1\right)$$

if the two light-receiving elements that do not receive a light beam during a scan cycle are both second light-receiving elements in the third set of light-receiving element pairs, then the object is positioned within the region II of the position-detecting surface, and the equation to determine the coordinates is the following:

$$(A, B) = \left(L - \left|\frac{n-m}{2}\right|, (W - L\tan\theta 1) + \frac{n+m}{2}\tan\theta 1\right)$$

if the light-receiving element at a left portion of the second side of the position-detecting surface that does not receive a light beam during a scan cycle is a first light-receiving element in the third set of light-receiving element pairs, and the light-receiving element at a right portion of the second side of the position-detecting surface that does not receive a light beam is a second light-receiving element in the third set of light-receiving element pairs, then the object is positioned within the region III of the position-detecting surface, and the equation to determine the coordinates is the following:

$$(A, B) = \left(L - \frac{n+m}{2}, (W - L) + \left|\frac{n-m}{2}\right|\tan\theta 1\right)$$

if the light-receiving element at a left portion of the second side of the position-detecting surface that does not receive a light beam during a scan cycle is a second light-receiving element in the third set of light-receiving element pairs, and the light-receiving element at a right portion of the second side of the position-detecting surface that does not receive a light beam is a first light-receiving element in the third set of light-receiving element pairs, then the object is positioned within the region IV of the position-detecting surface, and the equation to determine the coordinates is the following:

$$(A, B) = \left(\frac{n+m}{2}, W - \left|\frac{n-m}{2}\right|\tan\theta 1\right)$$

wherein '(A, B)' corresponds to the Cartesian coordinates of the object and 'm' and 'n' respectively correspond to distances of the two light-receiving elements in the third set of light-receiving element pairs not receiving a light beam during a scan cycle away from a left edge of the second side of the position-detecting surface, and 'm' is the distance of the left light-receiving element not receiving a light beam away from the left edge of the second side, while 'n' is the distance of the right light-receiving element not receiving a light beam away from the left edge of the second side.

7. The multi-touch optical touch panel of claim 1, wherein the control circuit is configured to cause the light-emitting element pairs to emit the plurality of light beams one-by-one in a sequential order.

8. A method of arranging a first set and a third set of plurality of light-emitting element pairs and a second set of plurality of light-emitting elements on a frame-shaped circuit board that surrounds the perimeter of a position-detecting surface, comprising:
arranging the first set of plurality of light-emitting element pairs on a first surface of the frame-shaped circuit board at various points along a first side of the position-detecting surface in a lengthwise direction, in which a first light-emitting element is arranged at the left side of each of the first set of light-emitting element pairs at an angle $180-\theta_1$ with reference to a first side, and a second light-emitting element is arranged at the right side of each of the first set of light-emitting element pairs at an angle $\theta_1$ with reference to the first side;
arranging the third set of plurality of light-emitting element pairs on a second surface of the frame-shaped circuit board at various points along the first side of the position-detecting surface in the lengthwise direction, in which a first light-emitting element is arranged at the left side of each of the third set of light-emitting element pairs at an angle $180-\theta_2$ with reference to the first side, and a second light-emitting element is arranged at the right side of each of the third set of light-emitting element pairs at an angle $\theta_2$ with reference to the first side; and
arranging the second set of plurality of light-emitting elements on the first surface of the frame-shaped circuit board, in which each light-emitting element is arranged at various points along the first side at 90 degrees with reference to the first side;
wherein there does not exist a multiple relationship among the angle $\theta_2$, 90 degrees and the angle $\theta_1$.

9. The method of claim 8, further comprising:
arranging two reflectors along two opposed sides of the position-detecting surface in a widthwise direction, wherein the reflectors are configured for reflecting light beams emitted by the first and third sets of light-emitting element pairs.

10. A multi-touch optical touch panel, comprising:
a position-detecting surface;
a frame-shaped circuit board around the perimeter of the position-detecting surface;
a first set of plurality of light-emitting element pairs secured on a first surface of the frame-shaped circuit board at various points along a first side of the position-detecting surface in a lengthwise direction, in which a first light-emitting element is arranged at the left side of each of the first set of light-emitting element pairs at an angle $180-\theta_1$ with reference to a first side, and a second light-emitting element is arranged at the right side of each of the first set of light-emitting element pairs at an angle $\theta_1$ with reference to the first side;
a third set of plurality of light-emitting element pairs on a second surface of the frame-shaped circuit board at various points along the first side of the position-detecting surface in the lengthwise direction, in which a first light-emitting element is arranged at the left side of each of the third set of light-emitting element pairs at an angle $180-\theta_2$ with reference to the first side, and a second light-emitting element is arranged at the right side of each of the third set of light-emitting element pairs at an angle $\theta_2$ with reference to the first side;
a second set of plurality of light-emitting elements on the first surface of the frame-shaped circuit board, in which each light-emitting element is arranged at various points along the first side at 90 degrees with reference to the first side; and two reflectors arranged along two opposed sides of the position-detecting surface in a widthwise direction, wherein the reflectors are configured for reflecting light beams emitted by the first and third sets of light-emitting element pairs;

wherein there does not exist a multiple relationship among the angle $\theta_2$, 90 degrees and the angle $\theta_1$.

* * * * *